United States Patent [19]

Jurgill et al.

[11] Patent Number: 5,346,361
[45] Date of Patent: Sep. 13, 1994

[54] AIR SEAL FOR PUMP WITH VERTICAL SHAFT

[75] Inventors: Daniel J. Jurgill, Wilburton; Gerald A. Wetzel, Ashland, both of Pa.

[73] Assignee: Goulds Pumps, Incorporated, Seneca Falls, N.Y.

[21] Appl. No.: 48,351

[22] Filed: Apr. 15, 1993

[51] Int. Cl.$^5$ ............................................. F04D 29/12
[52] U.S. Cl. ................................. 415/111; 415/168.2; 415/171.1; 415/230; 417/423.11; 417/424.1; 277/3; 277/14 V; 277/64; 277/135
[58] Field of Search ...................... 415/110, 111, 168.2, 415/175, 176, 171.1, 173.5, 174.5, 229, 230; 417/423.11, 424.1, 424.2; 277/3, 13, 14 R, 14 V, 57, 64, 74, 135

[56] References Cited

U.S. PATENT DOCUMENTS

| 2,764,943 | 10/1956 | Peters | 417/424.1 |
| 2,929,646 | 3/1960 | Smith | 277/64 |
| 4,521,151 | 6/1985 | Frater et al. | 415/171.1 |
| 5,048,847 | 9/1991 | Kovacs et al. | 277/106 |

FOREIGN PATENT DOCUMENTS 0747143 9/1944 Fed. Rep. of Germany ... 415/171.1
0223373 10/1986 Japan ................................. 277/3

Primary Examiner—Edward K. Look
Assistant Examiner—Christopher Verdier
Attorney, Agent, or Firm—Brezina & Ehrlich

[57] ABSTRACT

A sealing assembly to seal about a rotary shaft of a vertical pump assembly, the pump assembly including an impeller rotating within a cavity to pressurize a fluid entering the cavity, the sealing assembly including a pump housing and a gas filled enclosed chamber formed within said housing and in communication with the cavity. A liquid filled chamber in communication with the gas filled chamber prevents the escape of gas from the gas filled chamber when the fluid enters the gas filled chamber. A rotary seal inhibits the flow of liquid from the liquid filled chamber into the environment surrounding the housing. The flow of fluid into the gas filled chamber compresses the gas within the gas filled chamber to form a buffer zone to prevent contact between the fluid and the rotary seal.

13 Claims, 2 Drawing Sheets

AIR SEAL FOR PUMP WITH VERTICAL SHAFT

FIELD OF THE INVENTION

The present invention relates to vertical centrifugal pumps and specifically to an assembly for a vertical centrifugal pump and a rotary seal forming part of the sealing assembly which provides sealing about a shaft of the centrifugal pump and prevents contact between the fluid being pumped and the rotary seal.

BACKGROUND OF THE INVENTION

Vertical centrifugal pumping apparatus are widely used for pumping liquids. The vertical centrifugal pump typically includes a pump body having an impeller which is housed within an impeller casing. The impeller is connected to the lower end of a rotary shaft. Operably connected to the upper end of the shaft is an electric motor, steam turbine or other prime mover which rotatably drives the shaft. Fluid entering the casing at the center of the impeller is radially displaced and pressurized by the rotating impeller. The pressurized fluid then exits the casing through an outlet located along the periphery of the casing.

Connected intermediate the pump body and motor is a tubular shaft column or housing. The rotary shaft extends through the column and enters the casing through an aperture in a back plate connected to the upward face of the impeller casing.

Fluid within the impeller casing must be prevented from flowing through the aperture upward along the shaft, toward the motor and leaking into the environment. The sealing about the shaft in the centrifugal pump is frequently accomplished with compressive stuffing, mechanical seals or dynamic seals such as expellers. The stuffing or seal is inserted in a stuffing chamber or box formed between the shaft and the pump housing rearward of the impeller.

When the centrifugal pump is handling abrasive slurry-type liquids, these conventional sealing methods have drawbacks. The stuffing requires a large amount of clean water as a continuous flush for the purposes of cooling and lubrication. Contact between an abrasive slurry liquid and mechanical seals subjects the seals to abrasive wear, thus leading to costly sudden failures.

Dynamic seals or expellers function while the impeller is rotating. When the impeller ceases to rotate, static head pressure due to the columns of liquid in the discharge and suction piping force fluid within the casing through the aperture and upwards between the shaft and column. Therefore, the dynamic seal requires a secondary seal such as a mechanical seal to prevent leakage when the pump is not running. However, contact between the abrasive slurry liquid and the mechanical seal will contaminate and destroy the effectiveness of the seal.

Therefore, it is a primary object of the present invention to provide an assembly for sealing about the rotary shaft of a vertical centrifugal pump when the shaft is both rotating and stationary.

Another object of the present invention is to provide a sealing device which does not require continuous flushing for cooling and lubrication.

A further object of the present invention is to provide a device which seals about a rotary shaft of the centrifugal pump when the pump is handling highly abrasive slurry-type liquids.

SUMMARY OF THE INVENTION

Accordingly the present invention provides, a sealing assembly to seal about a rotary shaft of a vertical pump assembly, the pump assembly including an impeller rotating within a cavity to pressurize a fluid entering the cavity, the sealing assembly including a pump housing and a gas filled enclosed chamber formed within said housing and in communication with the cavity. A liquid filled chamber in communication with the gas filled chamber prevents the escape of gas from the gas filled chamber when the fluid enters the gas filled chamber. A rotary seal inhibits the flow of liquid from the liquid filled chamber into the environment surrounding the housing. The flow of fluid into the gas filled chamber compresses the gas within the gas filled chamber to form a buffer to prevent contact between the fluid and the rotary seal.

DESCRIPTION OF THE PREFERRED EMBODIMENTS

Figure 1:
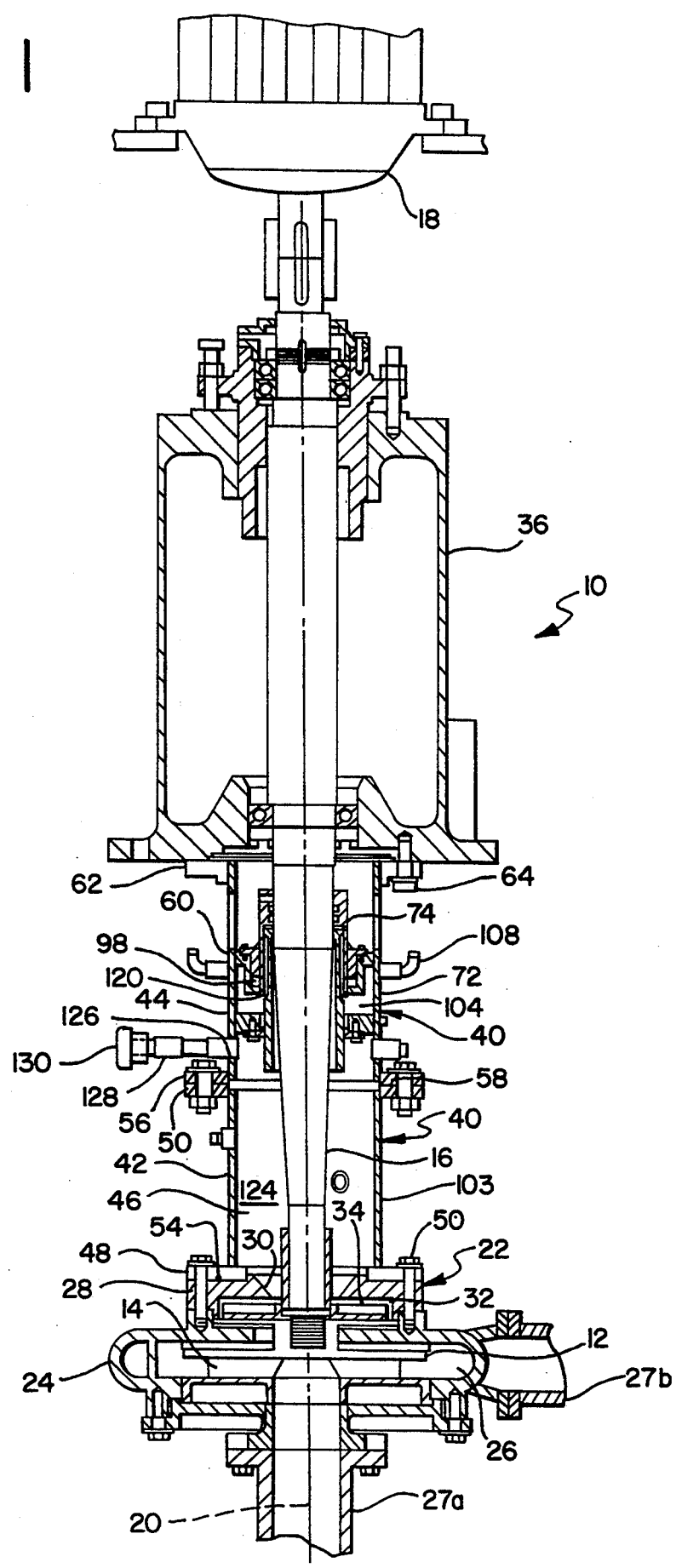
FIG. 1 is an elevational view in partial section, illustrating a vertical centrifugal pump assembly including one form of a air seal assembly constructed in accordance with the present invention.

Referring to FIG. 1, a vertical centrifugal pumping system is illustrated generally at 10. The centrifugal pump 10 includes a rotating impeller 12, having spirally arranged vanes 14. Fixedly attached to the impeller 12 is a rotary shaft 16. Operationally connected to the upward end of the shaft 16 opposite the impeller 12 is a prime mover apparatus which is preferably an electric motor 18 but can also be other devices such as a steam turbine. It is readily seen that the rotational movement supplied by the motor 18 operationally drives the impeller to rotate about a longitudinal axis 20.

The pump body, indicated generally at 22, includes an impeller casing 24. The impeller 12 rotates within impeller cavity 26 defined by the casing 24. As is well known, fluid supplied by suction piping 27a enters the cavity 26 at the center of the impeller 12 and the rotating vanes 14 drive the fluid toward the periphery of the cavity which pressurizes the fluid. The pressurized fluid then exits the cavity 26 through discharge piping 27b.

The pump body 22 includes a back plate 28 bolted to the upward face of the casing 24. The back plate includes a rearward aperture 30 which provides a passageway for the shaft 16 to extend through the back plate to the impeller 12. The back plate 28 and impeller casing 24 form an expeller chamber 32 which is in fluid communication with the cavity 26. Fixedly attached to the shaft 16 and disposed within the expeller chamber is a dynamic seal or expeller 34. As is well known, as the expeller 34, rotary shaft 16, and impeller 12 are rotating, the expeller acts to prevent the flow of fluid from the impeller cavity 26 through the expeller chamber 32 and upward along the rotating shaft; however, when the expeller, shaft and impeller cease to rotate, the columns of fluid in the suction piping 27a and discharge piping 27b exert static head pressure on the fluid in the casing thereby forcing the fluid through the expeller chamber and upward along the stationary shaft 16.

Rotatably supporting the shaft 16 and disposed intermediate the motor 18 and pump body 22 is a bearing housing 36. Intermediate the pump body 22 and bearing housing 36 and extending about the shaft 16 is the preferred embodiment of the air sealing assembly of the present invention, indicated generally at 40.

The air sealing assembly 40 includes a lower column 42 and an upper sealing assembly 44. The column 42 includes a sealed tube 46 coaxially disposed about the shaft 16. Rigidly and sealingly attached, typically by welding, to the ends of the tube 46 are lower flange 48 and upper flange 50. Lower flange 48 is removably connected to the back plate 28 and casing 24 with bolts 52. To form a seal between the back plate 28 and lower flange 48, the lower flange includes an O-ring seal 54. The aperture 30 provides fluid communication between expeller chamber 32 and column 42.

Figure 2:
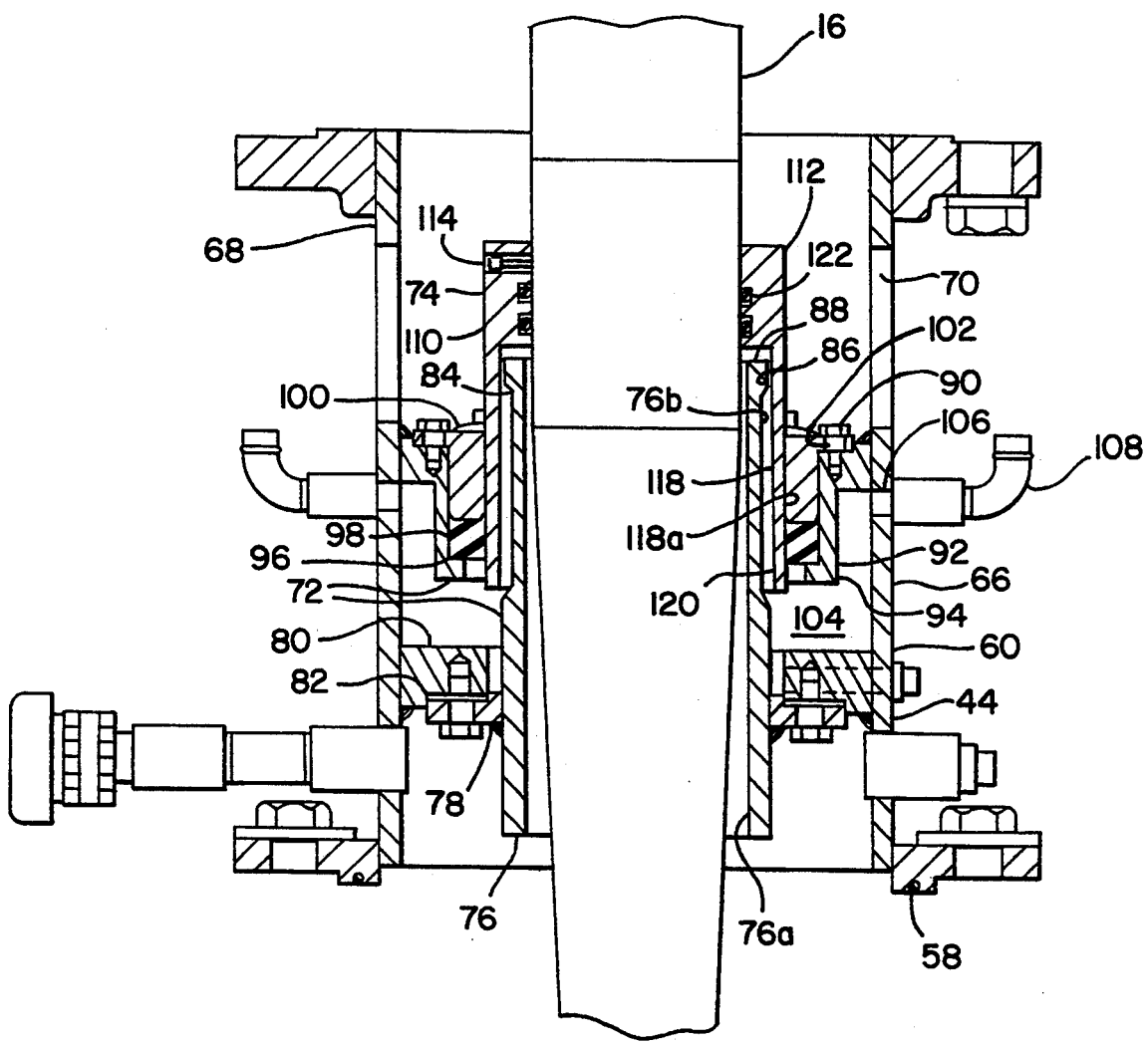
FIG. 2 is a detail elevational view, in partial section of a sealing assembly forming part of the sealing assembly of FIG. 1.

Boltedly connected to upper flange 50 is a lower flange 56 of the sealing assembly 44. To provide a gas-tight seal between upper flange 50 and lower flange 56, the upper flange includes an O-ring seal 58. Fixedly and sealingly attached, typically by welding, to lower flange 56 and extending upward about rotary shaft 16 is a tubular section 60 of the sealing assembly 44. Fixedly attached to the upper end of tubular section 60 is upper flange 62. Upper flange 62 is removably connected to bearing housing 36 by bolts 64. Referring to FIG. 2, tubular section 60 has a lower circumferentially enclosed portion 66 and an upper portion 68. Upper portion 68 defines several openings 70 which allow access to rotary shaft 16.

In an alternate embodiment (not shown) lower column 42 and upper sealing assembly 44 are integrally connected.

As best seen in FIG. 2, sealing assembly 44 includes a stationary assembly 72 and a rotary or rotating assembly 74. Stationary assembly 72 includes an annular tube 76 extending along rotary shaft 16 within tubular section 60. Annular tube 76 includes a radial flange 78 which is removably attached to a radial support flange 80 of the lower portion 66 of tubular section 60. A gasket 82 is disposed between radial flange 78 and support flange 80 to provide a gas-tight seal between the two flanges.

Annular tube 76 includes a cylindrical inner face 76a coaxial with rotary shaft 16. The clearance between shaft 16 and inner face 76a allows free rotation of the shaft. The annular tube 76 includes a thinner upper portion 84 and a lip 86 extending radially outward from an upper end 88 of the tube.

The stationary assembly 72 also includes a sealing assembly 90. The sealing assembly 90 includes a stuffing box cover 92 which is fixedly attached, typically by welding, to the lower portion 66 of the tubular section 60. The cover 92 includes a downwardly depending leg 94 which forms a seat 96. Disposed within the seat 96 is a high pressure rotary lip seal 98 such as an HP Oil Seal manufactured by Johns-Manville which inhibits the flow of liquid from the chamber 104 along the interface between the stationary assembly 72 and rotary assembly 74. To properly position the rotary seal 98 in the seat 96, the rotary sealing device 90 includes gland 100 which is removably attached to cover 92 with bolts 102.

The sealing assembly 90, lower portion 66 of tubular section 60 and column 42 form a housing 103 for pump assembly 10.

The outer wall 76b of annular tube 76 and the lower portion 66 of tubular section 60 form an annular chamber 104 which serves as a liquid container. Liquid within chamber 104 is preferably a lubricating-type liquid such as oil. To provide the oil to the chamber 104, lower portion 66 includes at least one oil supply port 106 through which oil supply tubing 108 extends. The level of oil within chamber 104 is sufficient to immerse rotary seal 98. The upper portion 84 of annular tube 76 extends vertically beyond the level of rotary seal 98 and preferably upward of cover 92 to prevent fluid in chamber 104 from flowing downward between shaft 16 and inner wall 76a of tube 76. Radial lip 86 also assists in preventing oil in chamber 104 from splashing over the upper end 88 of annular tube 76.

Rotating assembly 74 includes a collar 110 having an upper portion 112 which is configured to matingly fit about rotary shaft 16. The upper portion 112 is fixedly attached to rotary shaft 16 by set screw 114 so that the rotating assembly 74 rotates with the shaft 16. To provide a gas-tight seal between the collar 110 and the rotary shaft 16, the collar includes a plurality of O-ring seals 122. The rotating assembly 74 could also be formed integral with shaft 16. Integrally connected to upper portion 112 of collar 110 and extending downward about the rotary shaft 16 is annular skirt 118.

Annular skirt 118 extends downward between annular tube 76 and gland 100. The clearance between tube 76 and the skirt 118 allows free rotation of the skirt. Outer face 118a of annular skirt 118 is configured to rotate within and be in sealing contact with sealing device 90. Annular skirt 118 includes a portion 120 which is adapted to extend into annular chamber 104 and becomes submerged within the oil in the annular chamber.

Referring to FIG. 1, when the extension 120 is submerged within the oil in annular chamber 104, the sealing assembly 44 and column 42 form a sealed chamber 124 about rotary shaft 16 and back plate 28. To provide a one-way flow of gas into chamber 124 when the pressure of the gas within the chamber is less than a desired pressure, the lower portion 66 of tubular section 60 includes at least one port 126 through which a gas supply assembly 128 extends. In the preferred embodiment, the gas will be air and the gas supply assembly 128 includes a vacuum relief valve 130 which allows a one-way flow of air into the chamber 124 when the pressure of the gas within the chamber is less than atmospheric pressure.

In operation, oil is added to annular chamber 104 through tubing 108 until extension portion 120 is submerged in the oil and the level of oil is upwardly beyond rotary seal 98. Oil supply tubing 108 is then sealed to prevent oil from exiting the chamber 104. The fluid to be pumped enters the impeller cavity 26 and begins to flow upward through expeller chamber 32 and into column 42. The submergence of extension portion 120 of rotating assembly 74 into the oil within annular chamber 104 seals chamber 124, thereby preventing any escape of gas from the chamber. Thus as the fluid enters column 42, the liquid compresses the air in chamber 124. As liquid continues to enter column 42, the air will be compressed to a point where the pressure of the air is equal to the static head pressure, thereby preventing any further flow of liquid into chamber 124. The compressed volume of air in the chamber 124 acts as a buffer to prevent any contact between the fluid and rotary seal 98.

Upon activation of the electric motor 18, the rotary shaft 16, rotating assembly 74, expeller 34 and impeller 12 begin to rotate. The action of the expeller pumps fluid within the chamber 124 through the expeller chamber 32 and into the impeller casing 24. Should the removal of the pumped liquid from the chamber 124 create a negative pressure in the chamber, valve 130 opens and allows air to flow into the chamber through the gas supply assembly 128.

Referring to FIG. 2, as the rotating assembly 74 rotates, rotary seal 98 prevents the upward migration of oil from the annular chamber 104 between annular skirt 118 and gland 100. Thus, sealing assembly 90 retains oil in annular chamber 104 during operation of the pump assembly 10.

Referring to FIG. 1, when the pump ceases to operate, the expeller 34 is stationary; therefore, the static head pressure of the fluid within the suction and discharge piping 27a, 27b forces the fluid from the impeller casing 24 upward through expeller chamber 32 and rear aperture 30 and into chamber 124. As the fluid enters the chamber 124, the air contained within the chamber compresses, thereby becoming pressurized. The positive pressure of the air closes valve 130, preventing the escape of air through the supply assembly 128. As previously described, the emersion of extension portion 120 into the oil in chamber 104 prevents any escape of gas between the stationary assembly 72 and rotating assembly 74 and from chamber 124. As fluid continues to enter chamber 124, the air in the chamber continues to be compressed until the air pressure equals the pressure of the static head of the pumped fluid. At this equalized pressure the pressurized air in chamber 124 prevents any further flow of fluid into the chamber and acts as a buffer zone to prevent contact of the fluid in the chamber with rotary seal 98. Therefore, any abrasive material mixed in the slurry comprising the fluid in cavity 26 will be prevented by the air buffer zone from causing damage to rotary seal 98.

A specific embodiment of the novel air seal for pump with vertical shaft according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A sealing apparatus for a vertical centrifugal pump having a rotary shaft with a lower end operably connected to an impeller, said impeller rotating within a cavity in the pump to pressurize fluid entering the cavity, said sealing apparatus comprising:
   a chamber circumferentially disposed about the shaft, said chamber in fluid communication with the cavity;
   a stationary assembly disposed about the shaft;
   a rotary assembly disposed about and connected to the shaft, a portion of said rotary assembly extending over a portion of said stationary assembly;
   said rotary assembly and said stationary assembly forming sealing means to prevent the escape of gas from the chamber when the fluid enters said chamber from the cavity, the stationary assembly forming a second chamber for containing liquid, said portion of said rotary assembly extending into the second chamber such that said extending portion of said rotary assembly is submerged in the liquid to constitute part of said sealing means; and
   gas valve means in communication with said chamber for allowing the entry of a gas to said chamber when the pressure of the gas within said chamber is below a desired pressure.

2. The apparatus of claim 1 wherein said rotary assembly includes a collar circumscribing and fixedly attached to the shaft, said collar including a downwardly depending annular skirt which extends into the liquid in the second chamber.

3. The apparatus of claim 2 wherein said annular skirt includes an outer face, and said stationary assembly includes rotary sealing means for sealing between said outer face and said stationary assembly.

4. A sealing apparatus for a vertical centrifugal pump having a rotary shaft with a lower end operably connected to an impeller, said impeller rotating within a cavity in the pump to pressurize fluid entering the cavity, said sealing apparatus comprising:
   a chamber containing gas circumferentially disposed about the shaft, said chamber in fluid communication with the cavity;
   a stationary assembly disposed about the shaft and forming a second chamber for containing liquid;
   a rotary assembly disposed about and connected to the shaft, a portion of said rotary assembly extending over a portion of said stationary assembly;
   said rotary assembly and said stationary assembly forming sealing means to prevent the escape of gas from the chamber when the fluid enters said chamber from said cavity, said portion of said rotary assembly extending into the second chamber such that said extending portion of said rotary assembly is submerged in the liquid to constitute part of said sealing means, and stationary assembly including a rotary sealing means circumscribing and contacting a face of said rotary assembly for sealing between said face and said stationary assembly, the flow of fluid into said gas filled chamber compressing the gas within said chamber to form a buffer to prevent contact between the fluid and the rotary sealing means, said sealing means inhibiting the flow of liquid from said second chamber due to the compression of gas in said gas chamber.

5. A sealing assembly to seal about a rotary shaft of a vertical pump assembly, the pump assembly including an impeller rotating within a cavity to pressurize a fluid entering the cavity, the sealing assembly comprising:
   a pump housing;
   a gas filled enclosed chamber formed within said housing and in communication with the cavity;
   a liquid filled chamber in communication with said gas filled chamber for preventing the escape of gas from said gas filled chamber when the fluid enters said gas filled chamber; and
   rotary sealing means for inhibiting the flow of liquid from said liquid filled chamber into the environment surrounding said housing, the flow of the fluid into said gas filled chamber compressing the gas within said chamber to form a buffer to prevent contact between the fluid and the rotary sealing means.

6. The sealing assembly of claim 5 wherein said liquid filled chamber is annularly disposed about the shaft, said sealing assembly further including a collar connected to the shaft, said collar including an extending portion submerged in said liquid filled chamber.

7. The sealing assembly of claim 5 further including an annular tube disposed about said shaft, a portion of said annular tube forming a portion of said liquid filled chamber, said tube including an upper end extending upwards of said annular chamber to prevent the leakage of fluid from said annular chamber into said gas filled chamber.

8. The sealing assembly of claim 7 wherein said sealing assembly further includes a collar connected to the shaft, said collar including an extending portion submerged in said liquid filled chamber, said portion of said annular tube disposed between said extending portion and the shaft.

9. The sealing assembly of claim 5 further including gas supply means in communication with said chamber for allowing the entry of gas to said chamber when the pressure of the gas within said chamber is below a desired pressure.

10. The device of claim 5 further including liquid supply means in communication with said liquid chamber to provide a desired amount of liquid into said liquid chamber.

11. The device of claim 6 further including a cover and a gland disposed about said collar, said gland and said collar configured to form a seat for said rotary sealing means so that said rotary sealing means sealingly engages said collar.

12. The device of claim 11 wherein said rotary sealing means is immersed in the liquid in said liquid filled chamber.

13. The device of claim 5 wherein the liquid in said liquid filled chamber is oil and said rotary sealing means is a high pressure oil seal.

* * * * *